United States Patent Office 3,375,643
Patented Apr. 2, 1968

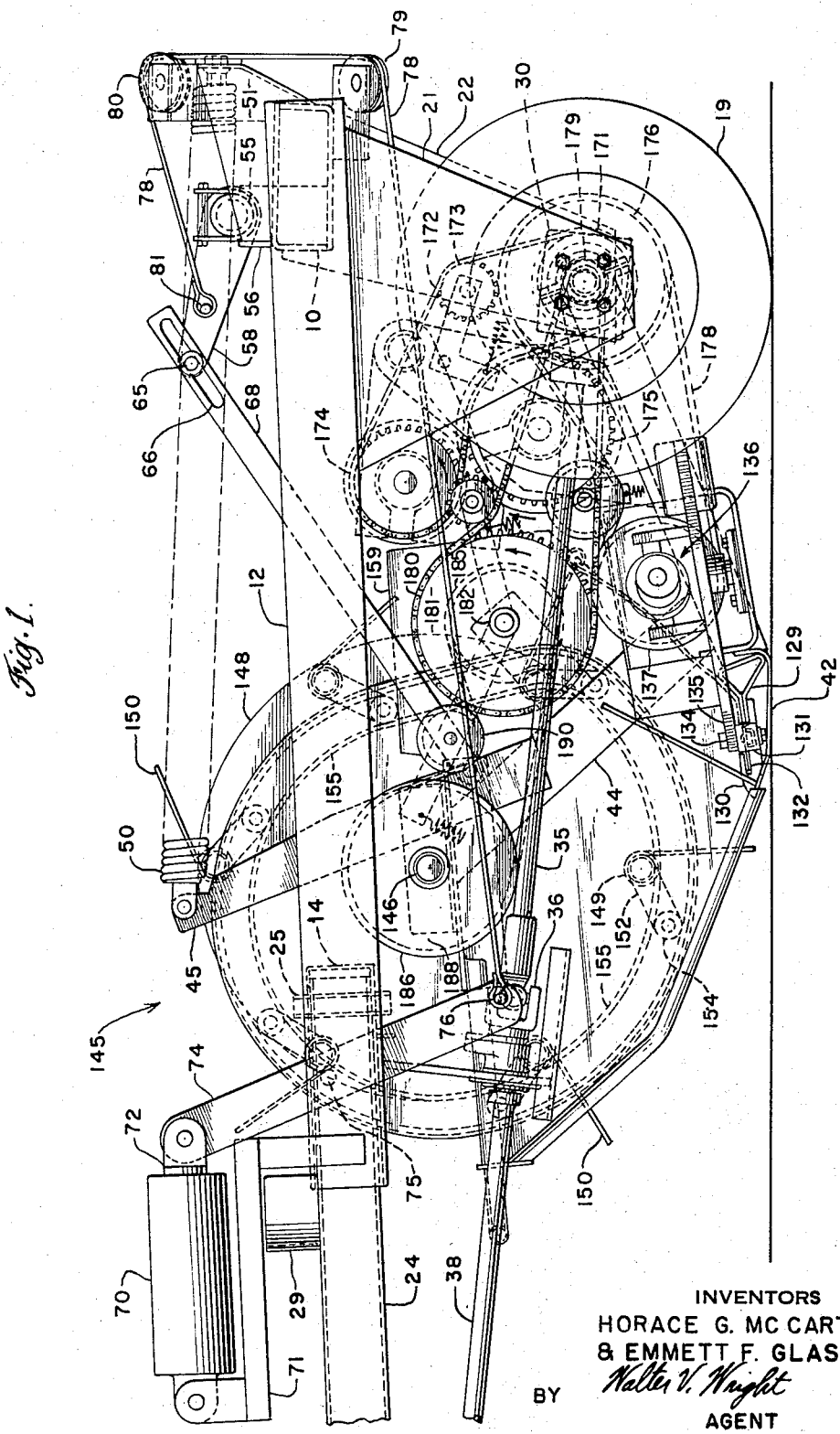

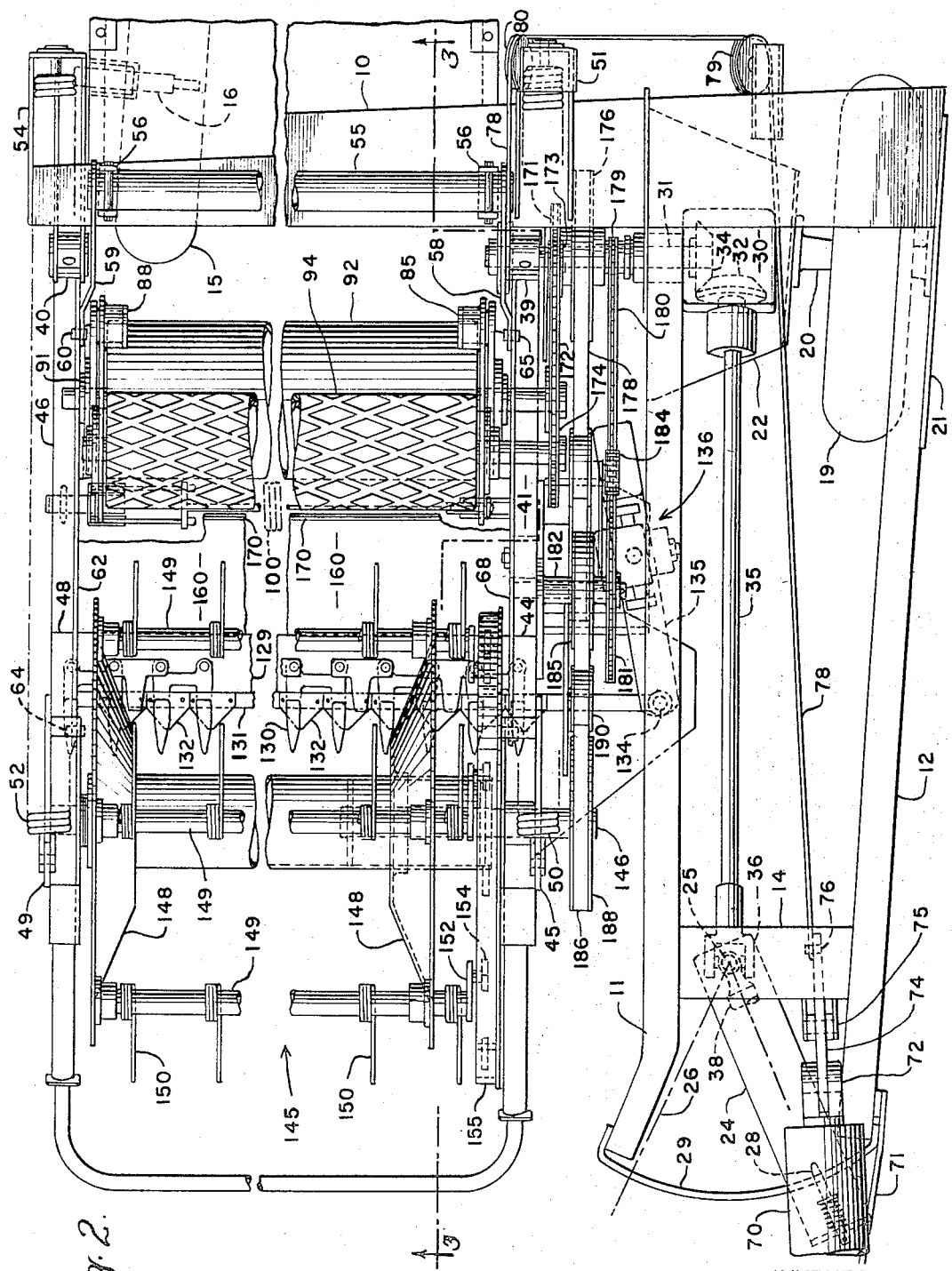

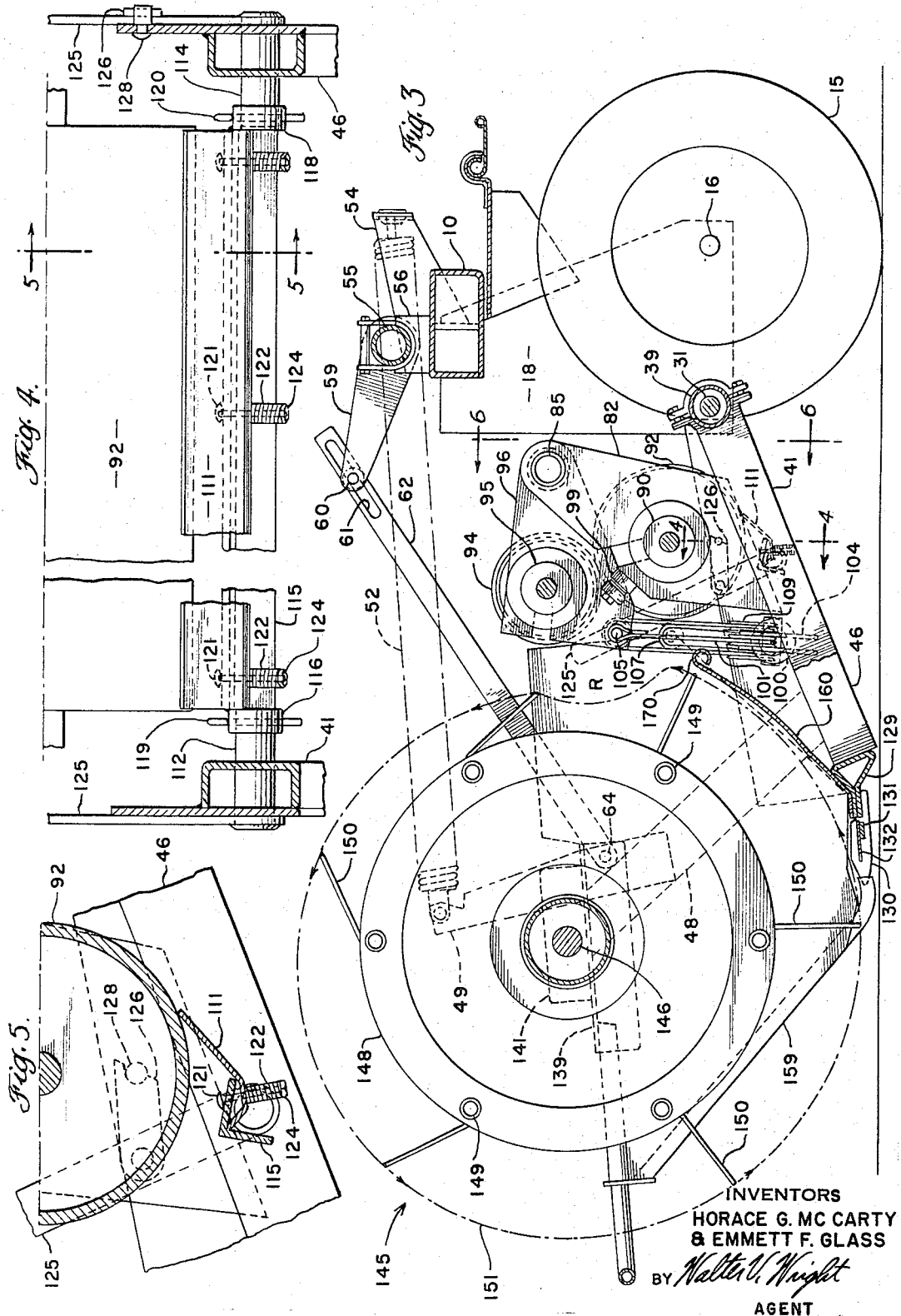

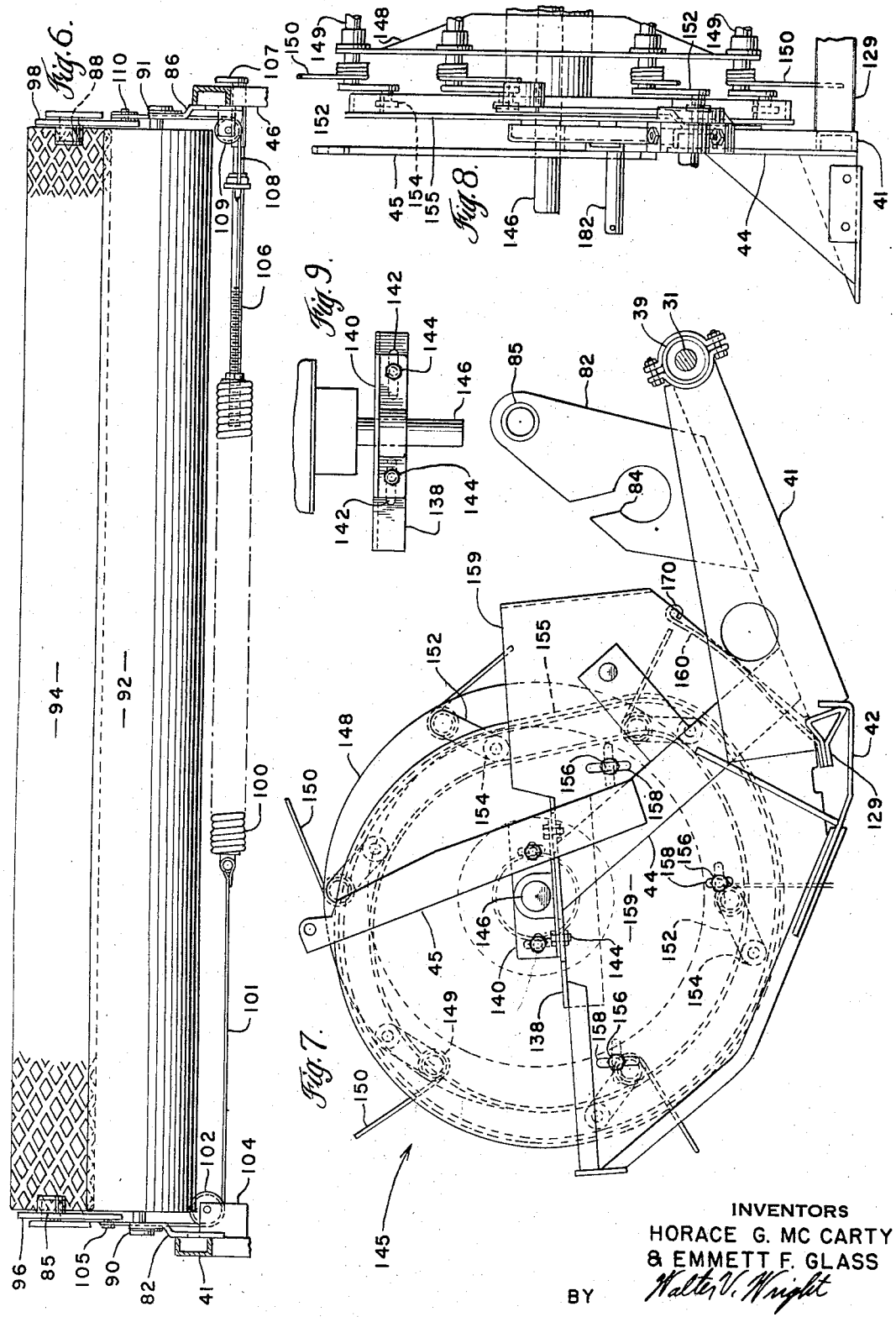

3,375,643
HARVESTING DEVICE
Horace G. McCarty, New Holland, and Emmett F. Glass, Akron, Pa., assignors to Sperry Rand Corporation, New Holland, Pa., a corporation of Delaware
Filed Oct. 14, 1964, Ser. No. 403,855
27 Claims. (Cl. 56—23)

This invention relates to equipment for harvesting hay or the like.

In hay harvesting operations, it is customary to condition crop material for drying after it is mowed and before is formed into windrows. The conditioning operation consists of passing the crop material between a pair of rolls which crack the stems to facilitate the escape of moisture. The best time to condition crop material is immediately upon mowing, before any wilting occurs. It is common practice to tow a conditioning implement behind a tractor on which is mounted a laterally projecting mower. With this arrangement, while a given swath of material is mowed, the previously mowed swath is conditioned. While this combination produces satisfactory results in small fields, as the field size increases so does the time lag between mowing and conditioning. With the present trend toward larger fields, crop wilting sometimes occurs between consecutive passes of the tractor. The more a crop is handled, the greater is the percentage of crop leaf loss in the field. This combination of implements picks up and drops the crop twice in performing the mowing and conditioning operations.

Attempts have been made in the past to combine mowing and conditioning mechanism in a single field machine. These machines spaced the conditioner rolls a substantial distance rearwardly of the mower and provided a floor or ramp to guide crop material from the mower to the conditioner. One such machine employed an endless belt conveyor. The speed and capacity obtainable by these early developments is inadequate by today's standards.

In recent years machines known as windrowers or swathers have become popular. These machines mow a wide swatch of crop material, then consolidate the swath into a relatively thick narrow windrow. Some of these machines then pass the windrow between conditioning rolls. This compromises the quality of the conditioning operation in favor of speed and high capacity. The cracking effect of the conditioning rolls on the stems of the crop material cannot be as effective on a relatively thick mat of material as on a thin layer of the same material.

It is an object of this invention to provide hay harvesting mechanism for mowing a swath of crop material and immediately conditioning the mown swath.

It is another object of this invention to provide a device for mowing and conditioning hay with minimum field losses.

It is another object of this invention to provide a hay mowing and conditioning device capable of high capacity and high speed operation without plugging or jamming.

It is another object of this invention to provide a hay mowing and conditioning device capable of accommodating a wide range of crops and crop conditions, and wherein any necessary adjustments are quickly and easily performed.

It is another object of this invention to provide a hay mowing and conditioning device wherein the crop material is raked from the mower and positively fed into gripping relation with the conditioner rolls.

It is another object of this invention to co-relate in a single hay harvesting machine a mower, a reel and a pair of conditioning rolls in such a manner as to improve the effectiveness of each element beyond its individual capability.

These and other objects and advantages of this invention will be apparent upon reference to the following description and claims taken in conjunction with the accompanying drawings wherein:

FIG. 1 is a side elevational view of a hay harvesting machine constructed in accordance with the principles of the present invention;

FIG. 2 is a plan view of the machine shown in FIG. 1 with the central portion of the machine broken out to condense the figure;

FIG. 3 is an irregular sectional view taken on the line 3—3 of FIG. 2;

FIG. 4 is an enlarged fragmentary sectional view taken on the line 4—4 of FIG. 3;

FIG. 5 is an enlarged sectional view taken on the line 5—5 of FIG. 4;

FIG. 6 is a fragmentary view of the machine looking as indicated by the arrows 6—6 in FIG. 3;

FIG. 7 is a fragmentary elevational view of the reel similar to FIG. 3 showing the reel cam and adjusting slots;

FIG. 8 is a fragmentary elevational view of the mechanism of FIG. 7 as seen when looking from right to left in FIG. 7; and FIG. 9 is a fragmentary plan view of the reel shaft journal means.

Referring now to the drawings, in detail, particularly FIGS. 2 and 1, the hay harvesting device of the present invention has a right angular base, or main, frame structure best seen in FIG. 2. A main frame member 10 extends transversely across the width of the device at the rear thereof. The machine is adapted to travel from right to left as it is seen in FIGS. 1 and 2. At the left side of frame member 10 a frame section comprising a pair of main frame members 11 and 12 projects forwardly and are interconnected near their front ends by a cross frame member 14. At the right side of frame member 10 a ground wheel 15 is journalled on a spindle 16 which is carried by frame plates 18 (see FIG. 3) depending from main frame member 10. At the left side of frame member 10 a ground wheel 19 is journalled on a spindle 20 which is carried by, and extends between, vertical frame plates 21 and 22 which are fixedly attached to, and depend from, frame members 10, 11 and 12. As may be seen in FIG. 2, the wheel spindles 16 and 20 may be canted relative to the direction of travel of the frame. A draw bar, or tongue, 24 extends forwardly from frame members 11 and 12 and is adapted to be connected in a conventional manner to a towing vehicle. The canting of the wheel spindles 16 and 20 creates a lateral drag opposite to that created by the laterally offset location of the draft tongue thereby providing substantially neutral handling characteristics in spite of the laterally offset tongue position. Tongue 24 is pivotally anchored to cross frame member 14 by a vertical pivot member 25 for lateral swinging movement between the operative position shown in FIG. 2 in solid lines and a road transport position indicated by the broken center line 26 in FIG. 2. The tongue may be latched in either position by a spring loaded pin 28 which projects through one of a series of holes (not shown) in a latch plate 29 carried by frame members 11 and 12.

A gearbox 30 is disposed just inboard of left ground wheel 19. Gearbox 30 has a transversely extending output shaft 31 which constitutes the main drive shaft of the machine. Bevel gears 32 and 34 supply driving power to shaft 31 from a forwardly extending shaft 35. Shaft 35 has a universal joint 36 disposed under tongue pivot member 25. A forward extension 38 from universal joint 36 is adapted to be connected to the power-take-off system of the towing vehicle.

Depending from frame member 10 coaxial with drive shaft 31 is a transversely disposed journal 39 (see FIG. 3). Coaxial with journal 39 but at the extreme right side of frame member 10 a similar journal 40 is disposed. A sub-frame structure is pivotally carried by journals 39 and 40 and extends forwardly therefrom. Referring primarily to FIG. 7, a main sub-frame member 41 extends downwardly and forwardly from journal 39 and carries a ground skid member 42 at its forward end. Just rearwardly of skid 42 a sub-frame member 44 extends upwardly and forwardly from member 41. Just above the midpoint of frame member 44 a rigid sub-frame member 45 extends upwardly at a slightly steeper angle. A sub-frame member 46 (FIGS. 2 and 3) substantially identical to member 41, extends downwardly and forwardly from journal 40 at the right side of the machine. A member 48 (FIG. 3) similar to member 44, extends upwardly and forwardly from frame member 46 at the right side of the machine. A member 49, substantially identical to member 45, is carried by member 48. A long fore-and-aft extending spring 50 has its forwardmost end pivotally connected to sub-frame member 45 as may be seen in FIGS. 1 and 2, for example. The rearmost end of spring 50 is anchored to a bracket 51 carried by, and standing upwardly from, main frame member 10. A similar spring 52 and anchoring bracket 54 are provided at the right side of the machine. The front end of spring 52 connects to sub-frame member 49. The springs 50 and 52 counterbalance the weight of the sub-frame structure and all the elements hereafter described which are carried thereby. The sub-frame is therefore free to float relative to the ground about mounting journals 39 and 40 in a substantially weightless manner.

In FIGS. 1 and 2 it may be seen that a rigid tube 55 overlies main frame member 10 within the transverse limits of the sub-frame structure. Tube member 55 has its ends journalled in brackets 56 mounted atop frame member 10. A forwardly extending lift arm 58 is rigidly carried by tube 55 at the left end thereof. An identical lift arm 59 is carried by tube 55 at the extreme right end thereof. As best seen in FIG. 3, the forward end of arm 59 carries a pin 60 slidably received in a slot 61 formed in the rear end of a downwardly and forwardly extending lift link 62. The forwardmost end of link 62 is pivotally connected at 64 to the right side of the sub-frame structure. An identical pin, slot and lift link 65, 66 and 68, respectively, are provided at the left side of the sub-frame structure. The pin and slot connections allow the sub-frame to float and follow the contours of the ground within the limits of the slots 61 and 66. Clockwise movement of tube 55 and lift arms 58 and 59 moves the pins 60 and 65 to the rear ends of slots 61 and 66 after which further clockwise movement of the lift arms and tube raises the sub-frame away from the ground about mounting journals 39 and 40. In order to raise lift arms 58 and 59, a hydraulic cylinder 70 (FIG. 1) is rigidly mounted by a bracket 71 to main frame member 12 at the front of the machine. Flexible couplings (not shown) are provided on cylinder 70 by which the cylinder may be operatively connected to the hydraulic system of a towing vehicle. The cylinder piston member 72 is pivotally connected to one end of a lever 74. As is best seen in FIG. 2, the midpoint of lever 74 is pivotally connected at 75 to a bracket disposed between main frame members 11 and 12 and rigidly carried by transverse main frame member 14. The other, or lower, end of lever 74 is pin connected at 76 to a flexible cable 78. Cable 78 extends rearwardly from lever 74 to and around a pair of pulleys 79 and 80 at the rear of the machine and then forwardly to left lift arm 58. A pin 81 connects cable 78 to left lift arm 58. Under the control of the operator of the towing vehicle, the piston member 72 of hydraulic cylinder 70 may be moved rearwardly as seen in FIG. 1. This pivots lever 74 about its pivot member 75 to swing the bottom end of lever 74 forwardly, thereby pulling cable 78 forwardly. This swings the lift arms 58 and 59 and their mounting tube 55 clockwise (FIG. 1) to the end of lost motion slots 66 and 61 and thereafter lifts the sub-frame structure through links 62 and 68.

In FIG. 7 it may be seen that a vertical plate 82 stands upwardly from left side sub-frame member 41. The plate 82 has an inverted keyhole-shaped opening 84 formed therein and carries a journal 85 at its uppermost end. An identical plate 86 (see FIG. 6) stands upwardly from right side sub-frame member 46 and carries a journal 88 at its uppermost end. Plate 86 is provided with an inverted keyhole-shaped opening identical to the opening 84 in plate 82. Referring jointly to FIGS. 3 and 6, it may be seen that bearings 90 and 91 are carried, respectively, in the keyhole-shaped slots in plates 82 and 86. A crop conditioner roll 92 has left and right end stub shafts journalled in the bearings 90 and 91, respectively. An upper crop conditioning roll 94 has its ends journalled in bearings, as indicated at 95 in FIG. 3, carried by left and right side plates 96 and 98 which are respectively pivotally mounted on journals 85 and 88 of upstanding plates 82 and 86. In this manner the upper conditioning roll 94 is mounted for vertical swinging movement away from and back toward lower conditioning roll 92. In FIG. 3 it may be seen that the axis, or shaft, of upper roll 94 is disposed forwardly of the shaft of lower roll 92 and that the diameter of lower roll 92 is larger than that of upper roll 94. Roll 92 is a smooth surfaced steel roll while upper roll 94 is provided with an aggressive tread-like surface as may be seen in FIGS. 2 and 6. The upper roll 94 may preferably be a rubber roll or a rubber coated steel roll. Adjustable screw type stop members 99 (FIG. 3) may be provided between the plates 96 and 82 and 98 and 86 to limit the extent of downward movement of upper roll 94 toward lower roll 92. Upper conditioner roll 94 is spring biased downwardly toward lower conditioner roll 92 by a transversely extending coil spring 100 (FIG. 6). A cable 101 extends from the left end of spring 100 to and around a pulley 102 which is carried by a bracket 104 mounted on the sub-frame side member 41. From pulley 102, cable 101 extends upwardly and is pin connected at 105 to the upper roll mounting plate 96 (see FIG. 3). A threaded rod 106 (FIG. 6) is carried by spring 100 at the right end thereof. Rod 106 is journalled on right side sub-frame member 46 and carrries a crank handle 107, a portion of which is visible in FIG. 6. A cable 108 has its ends anchored on rod 106, as may be seen in FIG. 6. Only one end is visible, the other end being behind rod 106. Cable 108 extends from one end around a double pulley 109, whose mounting bracket is carried by sub-frame side member 46, and then upwardly to and around a pulley 110 on upper roll right side mounting plate 98 and then back down around double pulley 109 to its other anchored end. The biasing force on upper conditioning roll 94 is adjusted by turning crank handle 107 (see FIG. 3) to rotate rod 106 thereby preloading spring 100.

In phantom lines in FIG. 3 it may be seen that a scraper blade 111 is provided for lower conditioning roll 92. Scraper 111 is shown in enlarged detail in FIGS. 4 and 5. In FIG. 4 it may be seen that a stub shaft 112 is journalled in left side sub-frame member 41. A similar stub shaft 114 is journalled in right sub-frame side member 46. An angle member 115 has a left collar 116 welded to its left end and a right collar 118 welded to its right end. Collars 116 and 118 receive shafts 112 and 114, respectively. Pins 119 and 120 lock the collars to the stub shafts. Scraper blade 111 has a J-shaped configuration in cross section as is best seen in FIG. 5. The short leg of the J embraces the vertex of angle member 115. A plurality of bolts 121 extend through angle member 115 and scraper blade 111 and carry springs 122 and nuts 124 on their other ends. In this manner blade 111 is resiliently attached to angle member 115. In FIG. 4 it may be seen that handles 125 are fixedly attached to stub shafts 112 and 114 and extend upwardly therefrom. One, or both, of handles 125 may pivotally carry latch pawls 126 (see FIG. 5). Pins 128 carried by the sub-frame structure, are engaged by latch pawls 126 to hold blade 111 in scraping engagement with lower conditioning roll 92. If the latch pawls 126 are disengaged from pins 128, the weight of the scraper blade structure biases the blade about stub shafts 112 and 114 out of engagement with roll 92. In some crops, it is desirable to have the scraper blade mechanism removed completely from the machine. This is accomplished by removing pins 119 and 120 and sliding stub shafts 112 and 114 out of collars 116 and 118.

In FIGS. 1, 2 and 3 it may be seen that cutting means comprising a mower cutterbar 129 is mounted on sub-frame side members 41 and 46 and extends therebetween. A plurality of conventional sickle guards 130 are fixedly mounted on cutterbar 129. A reciprocable sickle bar 131 having conventional triangular knives 132 rivited thereto is mounted on cutterbar 129 for reciprocation relative thereto transverse to the direction of travel of the machine. The left end (FIG. 2) of sickle bar 131 is pivotally connected at 134 to the forwardmost end of a fore-and-aft extending counterbalanced rocker arm 135. Rocker arm 135 constitutes the output member of a conventional wobbler drive 136 whose input member is the pulley 137 best seen in FIG. 1. The various drive trains will be more fully described hereafter, however, it will be apparent that horizontal oscillation of rocker arm 135 of wobbler drive 136 drives sickle bar 131 in transverse reciprocation.

In FIGS. 7 and 3 it may be seen that a generally horizontal angle iron member 138 is mounted at the upper forward end of left side sub-frame member 44. An identical angle iron member 139 is mounted atop right side sub-frame member 48. Journals 140 and 141 are bolted respectively to angle members 138 and 139. In FIG. 9 it may be seen that slots 142 elongated in the fore-and-aft direction, are provided in member 138 to receive the mounting bolts 144 of journal 140. The mounting of journal 141 on angle member 139 is the same as that shown in FIG. 9 for journal 140. Thus, the journals are adjustable relative to the sub-frame in a fore-and-aft direction. A reel, indicated generally by the reference numeral 145, has its central, or main, shaft 146 carried in journals 140 and 141. A plurality of discs 148 (FIG. 2) are mounted on shaft 146. A plurality of crop material engaging raking members in the form of bars 149 carrying tines or flexible fingers 150 are journalled on discs 148 and extend therebetween. In the embodiment shown, six such bars are equally spaced circumferentially about the discs 148. The direction of rotation and the path of travel of tines 150 is indicated by the dot and dash line 151 in FIG. 3. The tines travel in a circuitous path about reel shaft 146 and move downwardly into crop material ahead of sickle bar 131 and then sweep rearwardly over the sickle bar in close proximity thereto and then upwardly and rearwardly to a release location indicated by the letter R in FIG. 3. In FIGS. 8 and 7 it may be seen that each of the bars 149 has a crank-like arm 152 at its one end (the left end relative to the direction of travel of the machine). Each of the arms 152 carries a roller type cam follower 154 at its one end. The rollers 154 ride in a channel shaped cam track 155. The shape of cam track 155, which may be seen in FIGS. 1 and 7, is such as to cause the tines 150 to travel in the path indicated by the line 151 in FIG. 3 while the reel, in general, rotates about its shaft 146. Cam 155 is bolted in a fixed position relative to the axis 146 of reel 145. The cam mounting bolts 156 (FIG. 7) extend through slots 158 in reel journals 140 and 141 and sub-frame side plaes 159 which are fixed to sub-frame members 41, 44, 45 and 46, 48, 49 at each side of the reel. By loosening bolts 156, the operator can shift cam track 155 rotatably, within the limits afforded by slots 158, to adjust the path of tine travel relative to the mower, the conditioning rolls and the crop guiding surface in compensation for the different handling characteristics of different types of crops.

A crop material guiding plate 160 (FIGS. 3 and 7) extends between the sub-frame side plates 159 and is fixedly attached thereto. Guide plate 160 extends upwardly and rearwardly from the mower cutterbar 129 toward the downwardly and forwardly diverging crop material receiving bite of conditioner rolls 92 and 94. The plate 160 is generally concentric to the axis 146 of reel 145 and has a rear terminal edge at 170 which is parallel to the axes of the conditioning rolls and the shaft 146 of the reel. The terminal edge 170 of crop material guiding plate 160 is spaced forwardly from lower conditioning roll 92 an amount sufficient to allow stones and other foreign objects to fall to the ground rather than being fed between the conditioning rolls. The crop material engaging tines 150 of the reel sweep upwardly and rearwardly along the surface of plate 160 in close proximity thereto pushing mown crop material into gripping relation with the receiving bite of the conditioner rolls. At the location R, the cam track 155 causes bars 149 and tines 150 to pivot from their radially extended crop engaging position downwardly to a non-radial position from which rotation of reel 145 lifts the tines upwardly out of the crop material. Upper conditioner roll 94 rotates in the counterclockwise direction as seen in FIG. 3 and is disposed close to the path of tine travel to strip crop material downwardly from the tines as they move upwardly out of the material.

In FIGS. 1 and 2 it may be seen that the output shaft 31 of gearbox 30 carries a first sprocket 171 just outside of sub-frame mounting journal 39. An endless chain 172 extends upwardly therefrom to spring loaded idler 173. From idler 173, chain 172 extends upwardly and forwardly and about the forwardmost side of a drive sprocket 174 of top conditioner roll 194. Endless chain 172 then wraps about the rear side of a sprocket 175 of lower conditioner roll 92 and back to drive sprocket 171. On the outboard side of sprocket 171 shaft 31 carries a drive pulley 176. An endless belt 178 is entrained about pulley 176 and has an upper reach extending downwardly and forwardly therefrom and under an adjustable idler, not numbered. Belt 178 then wraps about the drive pulley 137 of the sickle bar wobbler drive unit 136 previously described and returns back to drive pulley 176. Since the rotational speed of reel 145 is substantially less than that of the conditioner rolls and the sickle drive mechanism, a speed reducing drive train is provided between drive shaft 31 and reel 145. A small diameter sprocket 179 is carried by shaft 31 between pulley 176 and grearbox 30. An endless chain 180 is entrained about sprocket 179 and a large diameter sprocket 181 carried by an idler stub shaft 182 journalled on the sub-frame. A small diameter spring loaded idler 184 engages the upper reach of chain 180 between sprockets 179 and 181 to maintain proper drive chain tension. A pulley 185 smaller than sprocket 181 is keyed to idler shaft 182 and driven thereby. An endless belt 186 is entrained about pulley 185 and a larger diameter pulley 188 keyed to reel shaft 146. A spring loaded idler 190 engages belt 186 between pulleys 185 and 188 to maintain proper belt driving tension.

The novel combination and relationship of elements to which the success of the present invention is directly attributable is most clearly seen in FIG. 3. It is the relationship and relative positioning on the sub-frame of the reel, the mower, the conditioner rolls and the guiding surface 160. Consider first the path of travel of the crop material engaging tines 150 of the reel. As in other known reels, these tines have a crop material engaging point and a crop material release point. The engaging point is forwardly of the mower to lift and rake tangled crops. The path of travel of the tines in moving from the point of crop material engagement to the release point extends over the mower means 131 and in close proximity thereto. This relationship positively rakes the cutterbar clean thereby substantially increasing the capacity of the mower beyond its individual capability while rendering the mower substantially unpluggable. From the mower, the tines 150 swing upwardly and rearwardly along guide plate 160 which confines the crop material to an area which is positively swept clean by the tines. The feeding capability of the reel is enhanced beyond that of conventional reels by the fact that the surface of plate 160 prevents movement of the crop material radially out of engagement with the tines. The rear terminal edge 170 of the crop material guiding surface is in close proximity to the path of the tine travel and is disposed at the point of release of the tines on the crop material. The guiding surface 160 directs material directly into the receiving bite of the conditioning rolls. The conditioning rolls are mounted in a position wherein they begin to engage the crop material as the tines begin to release it. Thus, the crop material is positively fed by the reel over the sickle bar and upwardly and rearwardly into the bite of the conditioning rolls. The large diameter of the lower conditioning roll 92 provides a large moving surface on the under side of the crop material being fed between the rolls while the relatively forward disposition of upper conditioning roll 94 along with the aggressive peripheral surface thereon positively strips crop material downwardly and rearwardly into the bite of the rolls from the tines 150 as they release the material and lift upwardly in front of the top conditioning roll. The positive feeding of crop material directly into the bite of the rolls by the reel prevents accumulation and bunching of material in front of the rolls. The above relationship of elements effects positive engagement and feeding control of the material to be harvested from a time prior to its being mowed until its exit from the conditioning rolls.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A device for harvesting crop material comprising a mobile frame adapted to travel forwardly through a field, an elongated reel having a central axis and crop material engaging tine members, means journalling said reel on said frame with the axis of the reel generally parallel to the ground and transverse to the direction of travel of said frame, means rotatably driving said reel about its central axis in a direction to move said crop material engaging tine members in a predetermined path of travel downwardly at the front of said reel then rearwardly under said reel axis in close proximity to the ground and then upwardly and rearwardly behind the axis of said reel, cutting means carried by said frame and disposed generally under said reel rearwardly of said central axis between said path of travel of said crop material engaging tine members and the ground and operable to mow a swath of crop material substantially the width of said reel, a fixed crop material guiding surface extending upwardly and rearwardly from said cutting means generally concentric to the axis of said reel and in close proximity to the path of travel of said crop material engaging tine members, said surface having a rear terminal edge behind said reel and also in close proximity to said path of travel of said crop material engaging tine members, a pair of parallel crop conditioning rolls having therebetween a crop material receiving bite, said rolls having a length substantially the same as said reel and coacting to condition the stems of crop material passing therebetween, means journalling said rolls on said frame behind and parallel to said reel with the bite of said rolls below said axis of said reel and adjacent said rear terminal edge of said crop material guiding surface, said crop material engaging tine members moving downwardly into crop material forwardly of said cutting means and then combing and sweeping said crop material rearwardly over said cutting means and then upwardly and rearwardly over said crop material guiding surface and discharge it directly into the bite of said conditioning rolls, and means rotating said rolls faster than said reel whereby said rolls strip crop material from said tine members.

2. A device for harvesting crop material as recited in claim 1 wherein one of said conditioning rolls is disposed above the other conditioning roll and has its axis disposed forwardly of the axis of said other roll whereby said crop receiving bite diverges downwardly and forwardly toward said upwardly and rearwardly extending crop material guiding surface.

3. A device for harvesting crop material as recited in claim 1 wherein one of said conditioning rolls is disposed above the other conditioning roll, said other conditioning roll being disposed behind said rear terminal edge of said crop material guiding surface and spaced therefrom a substantial distance to permit stones and other heavy foreign objects to fall through the space between said rear terminal edge and said other roll, and means rotatably driving said other roll in a direction to carry crop material upwardly and rearwardly thereover from said rear terminal edge.

4. A device for harvesting crop material as recited in claim 3 wherein said one of said conditioning rolls is disposed forwardly of said other conditioning roll and spaced above said rear terminal edge of said crop material guiding surface, and said means rotatably driving said one of said rolls in a direction to strip crop material downwardly from said crop material engaging tine members and feed said material rearwardly thereunder into said bite.

5. A device for harvesting crop material as recited in claim 1 wherein one of said conditioning rolls at least is provided with an aggressive peripheral surface.

6. A device for harvesting crop material comprising a mobile frame adapted to travel forwardly through a field, cutting means carried by said frame adjacent the ground for moving a swath of crop material, an elongated reel having a central axis and crop material engaging raking members, means journalling said reel on said frame above said cutting means with the axis of the reel generally parallel to the ground and transverse to the direction of travel of said frame, means rotatably driving said reel about its axis in a direction to move said crop material engaging raking members in a path of travel downwardly into crop material at the front of said reel and ahead of said cutting means then rearwardly under said reel axis and above said cutting means to sweep material rearwardly over said cutting means and then convey cut material upwardly and rearwardly behind the axis of said reel to a predetermined crop material release location above and behind said cutting means, means for changing the extension of said raking members at said release location whereby the raking members move upwardly out of engagement with said crop material, a pair of parallel fixed crop material conditioning rolls having therebetween a crop material receiving bite, said rolls having a length generally the same as said reel and coacting to condition the stems of crop material passed therebetween, and means journalling said rolls on said frame behind and parallel to said reel with the bite of said rolls disposed at said crop material release location of the crop material engaging reel members whereby said members sweep crop material rearwardly over said mower and discharge the material after it has been cut directly to the material receiving bite of said rolls.

7. A device for harvesting crop material comprising a mobile frame adapted to travel forwardly through a field, cutting means carried by said frame adjacent the ground for mowing a swath of crop material, an elongated reel having a central axis and crop material engaging tine members, means journalling said reel on said frame above said cutting means with the axis of the reel generally parallel to the ground and transverse to the direction of travel of said frame, means rotatably driving said reel about its central axis in a direction to move said crop material engaging tine members in a predetermined path of travel downwardly into crop material at the front of said reel and ahead of said cutting means then rearwardly under said reel axis and above said cutting means to sweep material rearwardly over said cutting means and then upwardly and rearwardly behind the axis of said reel to a predetermined crop material release location above and behind said cutting means, means for pivoting said crop material engaging tine members at said location whereby the tines move upwardly and out of said crop material, means carried by said frame and having a fixed crop material guiding surface extending upwardly and rearwardly from said cutting means generally parallel to the path of travel of said crop material engaging tine members and in close proximity thereto, said surface having a rear terminal edge at said predetermined crop material release location, a pair of parallel crop material conditioning rolls having therebetween a crop material receiving bite, said rolls having a length generally the same as said reel and coacting to condition the stems of crop material passed therebetween, and means journalling said rolls on said frame behind and parallel to said reel at said crop material release location with the bite of said rolls adjacent said rear terminal edge of said crop material guiding surface whereby said crop material engaging tine members sweep comb material rearwardly over said cutting means and then upwardly and rearwardly along said guiding surface and into the bite of said conditioning rolls.

8. A device for harvesting crop material as recited in claim 7 wherein said crop material engaging tines members are mounted on said reel for movement relative thereto between a radially extended crop sweeping position and a nonradial crop release position, cam means on said reel engageable with said crop material engaging members for controlling movement thereof between said crop material sweeping position and said release position and means adjustably mounting said cam means on said reel to facilitate adjustment of the point on said predetermined path of travel of said crop material engaging members at which said members are moved from their material sweeping position to their material release position.

9. A device for harvesting crop material as recited in claim 8 wherein said means journalling said reel on said frame is mounted on said frame for adjustment forwardly and rearwardly relative to the frame to adjust the relationship of said release location relative to said crop material receiving bite.

10. A device for harvesting crop material as recited in claim 7 wherein one of said conditioning rolls is disposed with its axis above and forwardly of the axis of the other of said conditioning rolls, and wherein the axis of said other conditioning roll is spaced rearwardly from said rear terminal edge a distance greater than the radius of said other roll to provide substantial space between said rear terminal edge of said guiding surface and said other roll for stones and the like to fall from the device without passing between said conditioning rolls.

11. In a harvesting machine:
elongated cutting mechanism disposed transversely of the path of travel of the machine;
an elongated, stationary ramp extending along said mechanism and being transversely inclined upwardly and rearwardly therefrom and in disposition to receive a crop cut by said mechanism;
structure disposed forwardly and above said mechanism for sweeping a swath of a crop rearwardly and upwardly into said mechanism, said structure having means for moving the cut swath up said ramp and thereupon projecting the same upwardly and rearwardly beyond the ramp before the cut crop is permitted to fall to the ground;
a crop-engaging bar extending transversely of said path of travel above the level of said mechanism and forwardly of said structure; and a crop conditioner substantially as long as said cutting mechanism disposed adjacent said moving means to receive projected material.

12. A harvesting machine as set forth in claim 11 wherein said crop conditioner is above and rearwardly of the ramp within the path of projection of the cut swath and comprises a pair of conditioning rolls mounted one above the other and between which the crop is passed.

13. A harvesting method comprising the successive, uninterrupted steps of sweeping a swath of a growing crop rearwardly and upwardly toward an elongated cutting zone and toward an elongated conditioning area disposed above and to the rear of said cutting zone, cutting the swath at said cutting zone while the crop is being swept thereinto, and thereupon conveying the cut crop smoothly, continuously and uniformly to higher elevations while it is maintained off the ground by:
catching the entire swath of the cut crop at an elongated, transversely inclined station extending upwardly and rearwardly from said zone, said zone, said station and said area being coextensive in length with and parallel to said swath, said area being spaced upwardly and rearwardly from the uppermost and rearmost extremity of said station;
disposing said entire swath of the cut crop over and onto said station by forces applied to the crop from directly above the station continuously in a direction extending upwardly and rearwardly from said zone, and while the crop remains in a condition spread along said station longitudinally of the latter;
combing the swath disposed on said station rearwardly along the entire length of said extremity closely adjacent the latter and along a region extending upwardly therefrom and coextensive in length therewith to forceably direct the swath upwardly and rearwardly into said area;
conditioning said crop within said area while the crop is in flight flowing upwardly and rearwardly from said station; and
projecting the crop in a continuous stream flowing along a path normal to, and extending upwardly and rearwardly from said area.

14. A harvesting machine comprising a mobile frame on which a mower, a reel, rotatable about its longitudinal axis, and a pair of cooperative conditioner rolls are mounted transverse to the direction of travel of said frame and all having substantially the same length, said mower being mounted on said frame forwardly of and below said rolls adjacent the ground for cutting a swath of crop material of a width substantially the length of said rolls, the latter defining a crop receiving bite below said reel axis and disposed directly adjacent said reel, characterized by a stationary guide plate extending upwardly and rearwardly from said mower toward the bite of said rolls, said reel having crop material engaging tine members at the outer periphery thereof for combing and sweeping crop material over said mower, then conveying cut material over said plate and discharging it directly to the bite of said rolls and means rotating said rolls faster than said reel to strip crop material from said tine members.

15. A device for mowing and conditioning crop material comprising a mobile frame having a pair of laterally spaced ground wheels and being adapted to travel forwardly through a field of standing crop material, an elongated reel having a central axis and crop material engaging tines, means journalling said reel on said frame with the axis of the reel generally parallel to the ground and transverse to the direction of travel of said frame, means rotatably driving said reel about its central axis in a direction to move said tines in a path downwardly at the front of said reel then rearwardly under said axis along the ground and then upwardly and rearwardly behind the axis of the reel, cutting means carried by said frame and disposed generally under said reel to mow a swath of crop material whose width substantially equals the axial length of the reel, a pair of rotatable crop material conditioning rolls each having substantially the same axial length as said reel and cooperating to condition crop material passed between them, one of said rolls at least having an aggressive crop material engaging surface, means journalling said rolls one above the other on said frame rearwardly of said reel and in close proximity to the path of travel of said reel tines, said rolls being parallel to each other and to said reel and defining a forward crop receiving bight, a stationary guide plate carried by said frame and having a crop material supporting surface extending upwardly and rearwardly from said cutting means to adjacent said bight of said conditioning rolls, said plate being in close proximity to said path of travel of said tines for a substantial portion of the upward rearward extension of the plate, said reel tines engaging and combing standing crop material forwardly of said cutting means and then sweeping the crop material over said cutting means and after it is cut then upwardly and rearwardly over said guide plate directly to said bight of said conditioning rolls, said guide plate slidably supporting the crop material as it is conveyed from the cutting means to said bight, and drive means rotating said rolls faster than said reel to strip material from said tines.

16. A device as recited in claim 15 wherein said tines are pivotally mounted on said reel, and means is provided for pivoting the tines during their path of travel when the tines are adjacent said roll bight to withdraw the tines from the material and facilitate the discharge of material to said rolls.

17. A device as recited in claim 15 wherein said guide plate has an upward rearward terminal edge spaced forwardly of the lower roll of said pair of rolls and beneath said bight, rocks and the like being adapted to drop through the space between the plate and said lower roll and thus not pass between the rolls.

18. A device for mowing and conditioning crop material as recited in claim 17 wherein the upper roll of said pair of rolls has an axis forwardly of the axis of said lower roll whereby said bight faces generally forwardly and downwardly to better receive crop material delivered upwardly and rearwardly over said guide plate and the axis of said reel being higher than said bight and forwardly of said cutting means.

19. A harvesting machine comprising a generally right angular frame structure having a frame member which extends transverse to the direction of travel and a frame section which extends forwardly from one lateral end of said frame member and generally parallel to ground travel, a pair of ground wheels, one adjacent each lateral end of said frame member, a drawbar on said frame section for connection to a towing vehicle, a mower, a reel and a pair of cooperative conditioner rolls mounted on said frame member transverse to said direction of travel and all having substantially the same length, said mower being mounted on said frame member forwardly of and below said rolls adjacent the ground for cutting a swath of crop material of a width substantially the length of said rolls, said rolls being located one above the other and defining a crop receiving bight relatively close to the path of travel of said reel, a stationary guide plate extending upwardly and rearwardly from said mower to a terminal location toward the bight of said rolls, said reel having crop engaging tines thereon for simultaneously combing the crop material from above and sweeping it over said mower and then upwardly and rearwardly over said guide plate and discharging the material directly to the bight of said rolls, said tines travelling closed to said guide plate as they travel over the plate, one of said rolls at least having an aggressive material engaging surface to strip crop material from said reel tines, and drive means rotating said reel and driving said rolls in opposite directions and faster than said reel whereby material will be passed between the rolls and discharged rearwardly therefrom for deposit on the ground.

20. A harvesting machine as recited in claim 19 wherein said upper roll has said aggressive material engaging surface which moves in a direction opposite to the travel of said tines on said reel whereby the upper roll strips material downwardly as the tines travel upwardly.

21. A harvesting machine comprising a generally right angular frame structure having a frame member which extends transverse to the direction of travel and a frame section which extends forwardly from one lateral end of said frame member and generally parallel to ground travel, a pair of ground wheels, one adjacent each lateral end of said frame member, a fore-and-aft extending drawbar on said frame section, a hitch at a forward end of said drawbar for connection to a towing vehicle, a sub-frame pivotally supported on said frame structure for movement relative to said transverse frame member, a mower, a reel, a fixed crop material guiding plate and a pair of cooperative conditioner rolls mounted on said sub-frame transverse to said direction of travel and all having substantially the same length, said mower being mounted on said sub-frame below said rolls adjacent the ground for cutting a swath of crop material of a width substantially the length of said rolls, said rolls being located one above the other and defining a forward crop receiving bight adapted to receive crop material from said mower without the material touching the ground, said fixed crop material guiding plate on said frame extending upwardly and rearwardly from said mower toward the bite of said rolls, said reel having radial crop engaging flexible fingers thereon for engaging crop material upon rotation of the reel to facilitate the engagement of the material by said mower and then discharging cut material directly to said rolls, one of said rolls at least having an aggressive material engaging surface to engage and positively convey material after it has been cut by said mower, and drive means rotating said reel and driving said rolls in opposite directions whereby material will be passed between the rolls and discharged rearwardly therefrom for deposit on the ground.

22. A harvesting machine as recited in claim 21 wherein said forwardly extending frame section comprises a pair of laterally spaced, fore-an-aft members connected at their rearward ends to said transverse frame member and at their forward ends by a cross member, and said drawbar being pivotally connected adjacent the forward end of said frame section.

23. A device for harvesting crop material comprising a mobile frame adapted to travel forwardly through a field, a pair of rolls which coact to condition the stems of crop material passed therebetween, means journalling said rolls on said frame with their axes parallel to each other and transverse to the direction of travel of said frame, said rolls defining therebetween a rearwardly converging crop material receiving bite, a mower mounted on said frame forwardly of and below said rolls adjacent the ground for cutting a swath of crop material of a width substantially the length of said rolls, a fixed crop material guiding plate on said frame extending upwardly and rearwardly from said mower toward the bite of said rolls, a reel having a central axis of rotation above and forwardly of said bite and crop material engaging raking members which travel in a circuitous path about said axis, said fixed guiding plate being located in close proximity to said circuitous path of said raking members, journals on said frame mounting said reel in a position wherein said crop material engaging raking members sweep rearwardly over said mower then upwardly and rearwardly along said material guiding plate to said bite of said rolls to conveyor material over the plate and discharge crop material cut by said mower directly into the bite of said rolls, and means rotating said rolls at speeds faster than said reel whereby the rolls strip the delivered crop material from said raking members.

24. A device for harvesting crop material comprising a mobile frame adapted to travel forwardly through a field, an elongated reel having a central axis and crop material engaging raking members, means journalling said reel on said frame with the axis of the reel generally parallel to the ground and transverse to the direction of travel of said frame, means rotatably driving said reel about its central axis in a direction to move said crop material engaging raking members in a path of travel downwardly at the front of said reel then rearwardly under said axis in close proximity to the ground and then upwardly and rearwardly behind the axis of said reel, cutting means carried by said frame and disposed generally under said reel between said path of travel of said crop material engaging raking members and the ground and operable to mow a swath of crop material whose width substantially equals the axial length of said reel, a pair of crop material conditioning rolls each having substantially the same axial length as said reel and cooperating to condition the stems of crop material passed therebetween, means journalling said rolls on said frame rearwardly of said reel and in close proximity thereto with the axes of said rolls parallel to the axis of said reel, means carried by said frame and having a fixed crop material guiding surface extending upwardly and rearwardly from said cutting means toward said conditioning rolls generally parallel to and in close proximity to the path of travel of said crop material engaging raking members, said crop material engaging raking members engaging crop material forwardly of said cutting means and then sweeping said crop material rearwardly over said cutting means and then conveying cut material upwardly and rearwardly over said crop material guiding surface and then discharging the material directly to said conditioning rolls, and means rotating said rolls faster than the speed of said reel whereby the rolls exert a stripping action on said raking members.

25. A device for harvesting crop material as recited in claim 24 wherein one of said pair of crop conditioning rolls is an upper roll disposed generally above the other of said pair of rolls in crop stripping relation to said crop material engaging raking members, means rotatably driving said upper roll in a direction to strip crop material downwardly and rearwardly from said raking members and carry said material between said rolls, and one of said rolls having a relatively aggresive surface.

26. A device for harvesting crop material as recited in claim 25 wherein said upper crop conditioning roll is forwardly of said other roll whereby the bite between the rolls faces downwardly.

27. A method of mowing a given width swath of standing crop material and then immediately conditioning the cut crop while maintaining the material in a continuous stream and substantially in said given width comprising:
    travelling over a field having the crop to be harvested,
    raking the standing crop with finger-like elements which travel in a downward, rearward direction and then sweep the crop in a rearward and upward path,
    cutting the standing crop as it is being raked and swept rearwardly
    catching the entire swath after it is cut and maintaining the crop off of the ground in a transverse mat substantially as wide as the swath cut,
    supporting said mat from below on a fixed upwardly and rearwardly extending guide surface in close proximity to said rearward and upward path,
    combing and conveying said mat rearwardly with said finger-like elements as the crop is supported and forceably directing the cut crop in an upward rearward direction,
    discharging said mat from said guide surface and at the same time withdrawing said finger-like raking elements from the crop coupled with simultaneously exerting a positive pulling force at the discharge location to strip the material from said raking elements,
    conditioning the transverse mat by passing it between a pair of rolls and while still maintaining the crop substantially as wide as the swath cut,
    and then projecting the conditioned mat in a continuous rearward stream.

References Cited

UNITED STATES PATENTS

| | | | |
|---|---|---|---|
| 2,698,170 | 12/1954 | Foley | 56—1 X |
| 3,165,875 | 1/1965 | Mitchell. | |
| 3,224,177 | 12/1965 | Adee | 56—23 |
| 1,926,538 | 9/1933 | Hume et al. | 56—226 |
| 2,114,580 | 4/1938 | Thompson | 56—1 |

ANTONIO F. GUIDA, *Primary Examiner.*

ABRAHAM G. STONE, *Examiner.*